Dec. 7, 1948.  W. H. DAILEY, JR  2,455,564
SPOT WELDING APPARATUS
Filed May 26, 1948  3 Sheets-Sheet 1
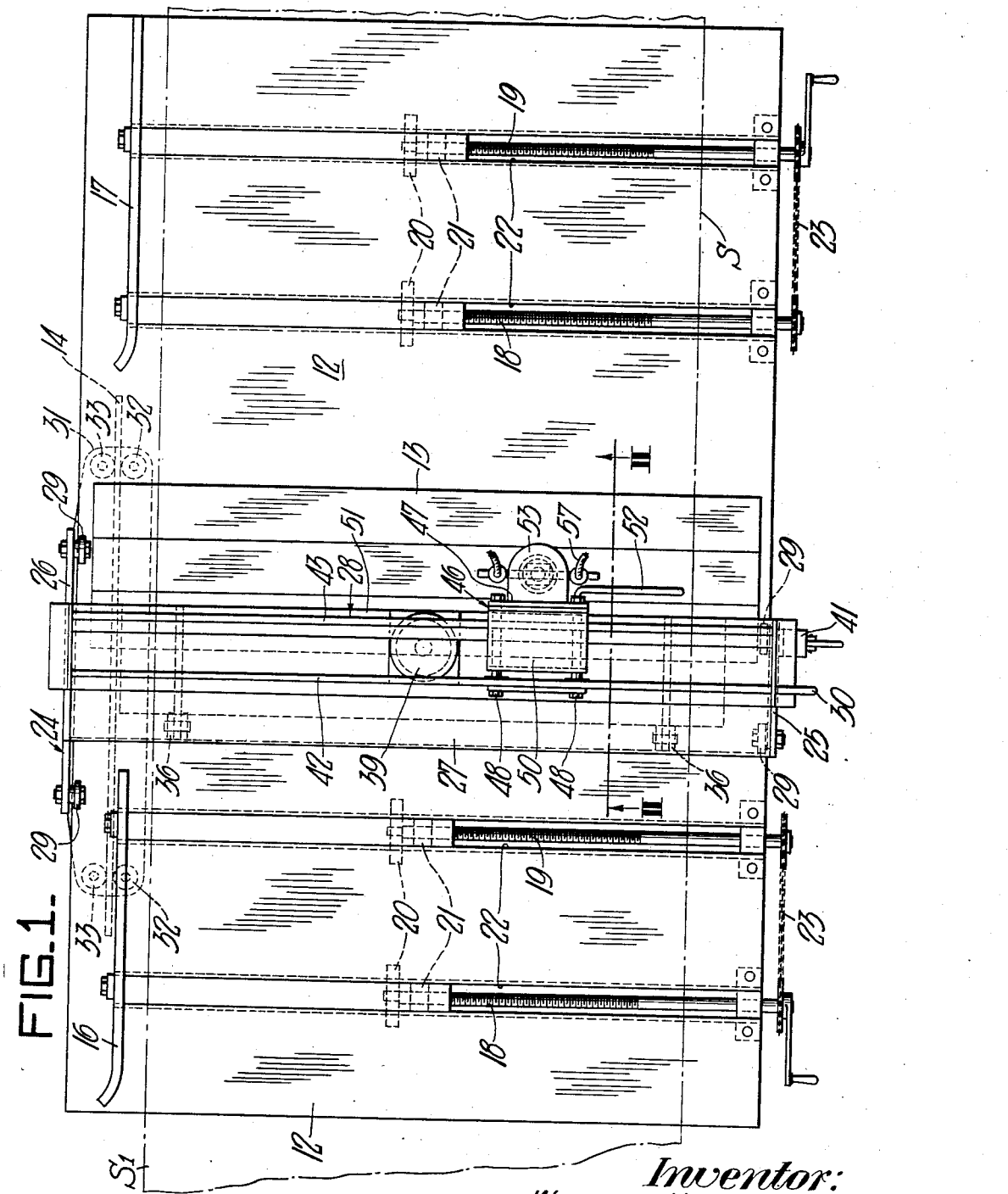
Inventor:
WILLIAM H. DAILEY, JR.,
by: Donald G. Dalton
his Attorney.

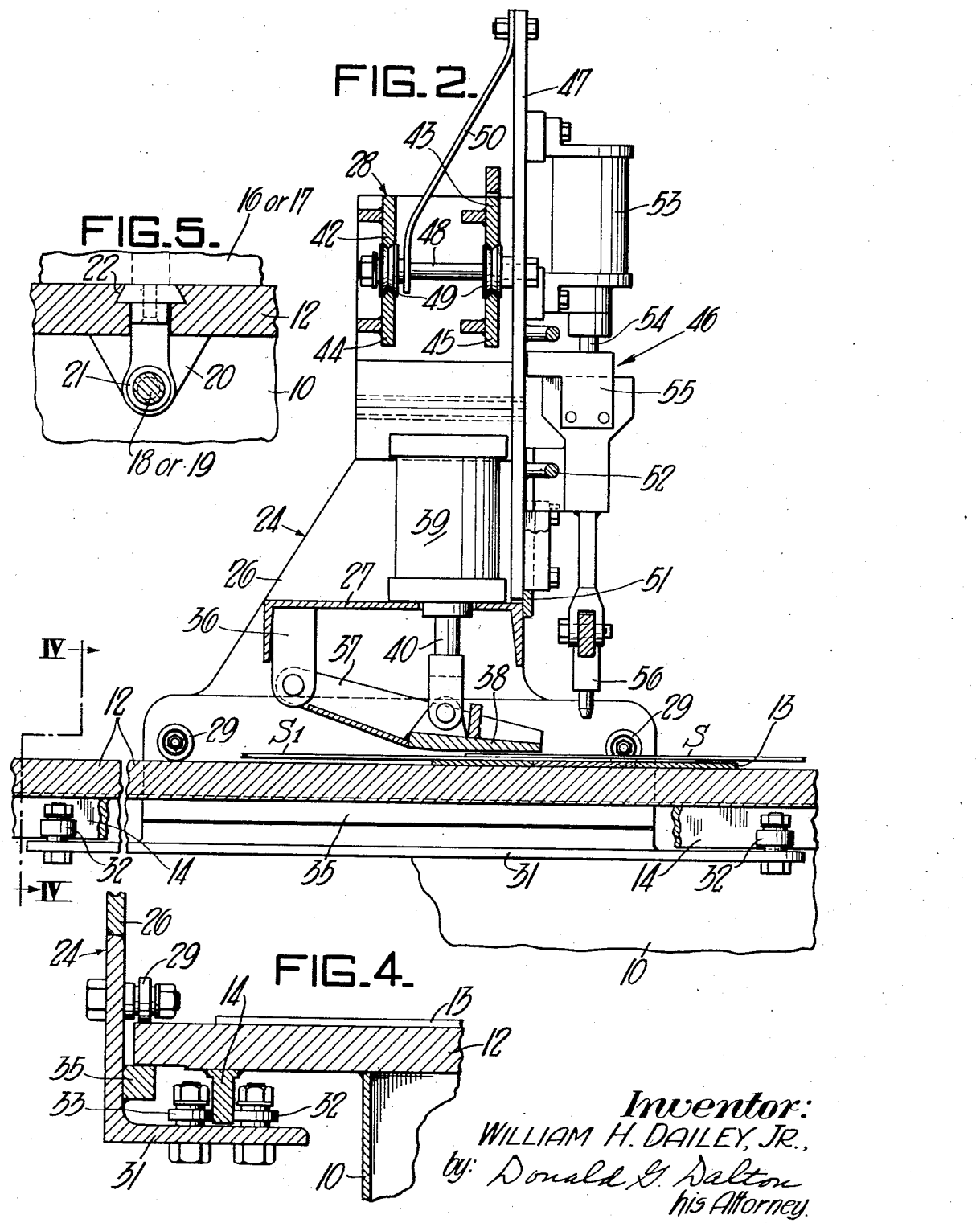

Dec. 7, 1948. W. H. DAILEY, JR 2,455,564
SPOT WELDING APPARATUS
Filed May 26, 1948
3 Sheets-Sheet 3
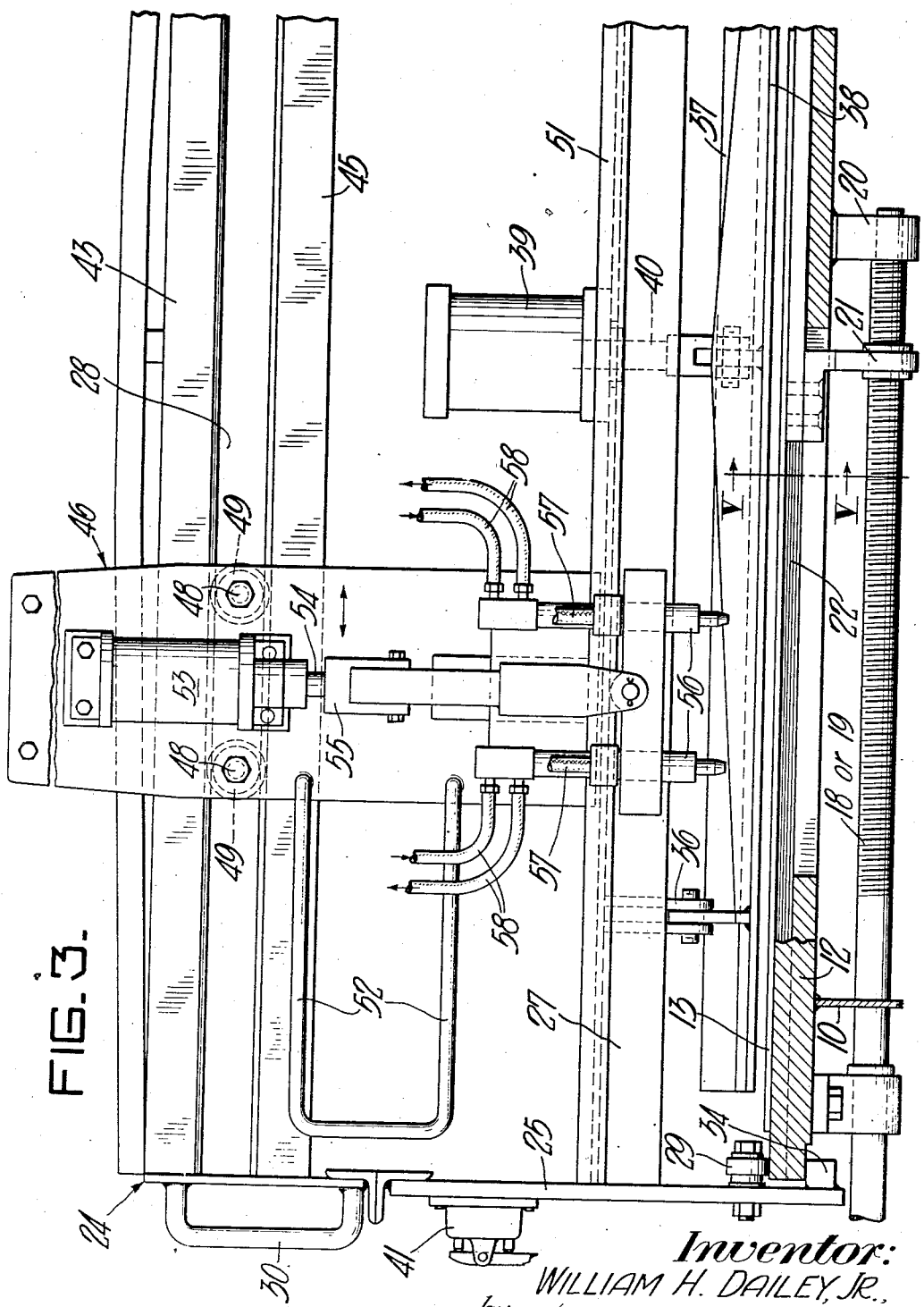
Inventor:
WILLIAM H. DAILEY, JR.,
by: Donald G. Dalton
his Attorney.

Patented Dec. 7, 1948

2,455,564

UNITED STATES PATENT OFFICE 2,455,564

SPOT WELDING APPARATUS

William H. Dailey, Jr., Library, Pa., assignor to Carnegie-Illinois Steel Corporation, a corporation of New Jersey Application May 26, 1948, Serial No. 29,337

8 Claims. (Cl. 219—4)

This invention relates to apparatus for spot welding metal strips, particularly for joining strips preliminary to their entry to a continuous processing line, such as a box annealing furnace.

When metal strips are treated in continuous processing lines, the trailing end of each strip is welded to the leading end of the strip following. For most purposes the strips are lap welded; that is, the strip ends are overlapped and joined by a number of spot welds. Before the strips are welded, they must be accurately aligned longitudinally, and preferably the welds are placed in straight lines perpendicular to the longitudinal center line of the strips to distribute pulling stresses uniformly across the width. To afford time for welding the strip ends without stopping continuous lines, such lines commonly have a "looper pit," which is beyond the welding station and in which a considerable length of slack strip accumulates. The lag afforded by the looper pit is rather brief; hence the strips must be aligned and welded expeditiously.

An object of the present invention is to provide improved spot welding apparatus which aligns the strips expeditiously and accurately and welds them and controls the position of the welds.

A further object of the invention is to provide a simple and rugged spot welding apparatus that positions the ends of strips accurately in alignment, clamps the ends together and applies strings of spot welds in straight lines across the strip perpendicular to the longitudinal center line.

In accomplishing these and other objects of the invention, I have provided improved details of structure, a preferred form of which is shown in the accompanying drawings, in which:

Figure 1 is a top plan view of an improved welding apparatus embodying features of the present invention;

Figure 2 is a vertical sectional view of the apparatus taken substantially on line II—II of Figure 1;

Figure 3 is a front elevational view of the apparatus, partly in section;

Figure 4 is a vertical sectional view taken substantially on line IV—IV of Figure 2; and Figure 5 is a vertical sectional view taken substantially on line V—V of Figure 3.

Referring more in detail to the drawings:

The welding apparatus of the present invention comprises a support 10 which has a flat horizontal table top 12 along which strips S and $S^1$ pass preliminary to their entry to a continuous processing line. The direction of strip travel is from right to left as viewed in Figures 1 and 2. The side of the support at the left as viewed in Figure 3 is the position of an operator of the apparatus. The table top has a facing 13 of electrically conductive material which furnishes one electrode for conducting welding current to the strips. The underface of the table top has a longitudinally extending guide rail 14 spaced from one of its edges (Figures 2 and 4).

Longitudinally extending strip guide bars 16 and 17 are carried on the table top on the side away from the operator's position and are adjustable transversely of the table top (Figures 1 and 5). Preparatory to welding, strips S and $S^1$ are aligned longitudinally against these guide bars and their ends are overlapped. The adjusting means for the guide bars conveniently includes a pair of spindles 18 and 19 for each guide bar. Said spindles are accessible for adjustment at the operator's position and are rotatably received in bearings 20 fixed to the underside of the table top, and threadedly engaged with bearings 21, which are fixed to the guide bars and extend through transverse slots 22 in the table top. The spindles of each pair are connected to rotate together by a chain and sprocket mechanism 23.

A transverse frame 24 bridges the table and is formed of side plates 25 and 26, a transverse beam 27, which connects the side plates midway of their height, and a transverse trackway 28, which connects the side plates at their upper extremities (Figures 2 and 3). Rollers 29 are rotatably carried on the side plates and rest on the table top, thus supporting the frame on the table top for adjustment longitudinally of the latter. Preferably side plate 25 at the operator's side of the support carries a handle 30 to facilitate adjustment of the frame with respect to the table.

The bottom edge of side plate 26 has an elongated inwardly extending flange 31 (Figures 1, 2 and 4). Inner rollers 32 and outer rollers 33 are rotatably carried on flange 31 and engage the inside and outside faces respectively of guide rail 14, thus constraining movement of the frame to a straight longitudinal path. Lock bars 34 and 35 are fixed to side plates 25 and 26 directly beneath the edges of the table top, but normally clear the latter sufficiently to permit free longitudinal adjustment of the frame. When the frame is lifted in a manner hereinafter explained, said lock bars engage the underface of the table top and fix the frame with respect to the support.

Transverse beam 27 has downwardly extending hinge brackets 36 (Figures 2 and 3). A clamping plate 37 is hinged at its rear to said brackets and has a substantially flat forward portion 38. The clamping plate has a lowered position, in which its flat forward portion 38 engages and holds overlapped strips S and S¹ on the table top, and a raised position in which it clears the strips. Beam 27 carries a double acting pneumatic cylinder and piston 39. A piston rod 40 operatively connects the piston to clamping plate 37 for raising and lowering the latter, the joint between the rod and plate being sufficiently loose that vertical movement of the rod can swing the plate about its hinge to the extent necessary. Any suitable valve mechanism may be employed for controlling admission of fluid to the cylinder, a hand operated valve 41 carried on side plate 25 being illustrated. Lowering the clamping plate simultaneously lifts the frame and thereby moves lock bars 34 and 35 into engagement with the underface of the table top. Thus operation of a single control both fixes the frame with respect to the table top and clamps the overlapped strip ends firmly together, the strips previously having been aligned against guide bars 16 and 17.

Trackway 28 preferably comprises a pair of spaced apart upper rails 42 and 43 and a pair of spaced apart lower rails 44 and 45 arranged as best shown in Figure 2. A welding carriage 46 is supported on the forward side of frame 24 for transverse movement across the support. Said carriage includes a vertical plate 47 which rotatably carries a pair of axles 48. Rollers 49 on said axles ride between the upper and lower rails of the trackway. Preferably the axles are reinforced by a brace 50. Preferably the lower edge of plate 47 rides against the top of beam 27, being retained thereon by a guide strip 51 welded to said beam. Preferably plate 47 carries a handle 52 extending to the operator's side of the apparatus (Figure 3).

The face of plate 47 carries a pneumatic cylinder and piston 53 which has a downwardly extending piston rod 54. The piston rod is movable vertically and preferably it extends through a guide bushing 55 fixed to the face of plate 47 beneath the cylinder. The lower end of piston rod 54 carries one or more electric welding guns 56 of a known construction. Electric current is conducted to said guns via cables 57 and cooling water is circulated via hoses 58.

The piston and cylinder effect raising and lowering of the welding guns. When the guns are lowered they engage the strips and apply spot welds thereto. Admission of air to the cylinder is controlled by any suitable valve mechanism, preferably being foot operated in order that the operator's hands may be free for positioning the carriage and frame and operating valve 41.

The structure of the various valves, pneumatic cylinders and pistons and welding guns has not been illustrated in detail for the reason that these are standard parts and their structure per se is not part of the present invention.

In operation, a strip S¹ passes along table top 11 on its way to a continuous processing line. When the trailing end of strip S¹ reaches the table top, the leading end of a new strip S is introduced to the table top and the two strips are longitudinally aligned against guide bars 16 and 17 and their ends are overlapped. Frame 24 is adjusted longitudinally of the support to a position in which welding guns 56 are directly over the line at which it is desired to apply a string of spot welds. Valve 41 is actuated to lower clamping plate 37 into engagement with the overlapped strip ends and simultaneously to raise the frame and fix its position with respect to the support. The welding carriage 46 is moved across trackway 28 and at frequent intervals, the foot valve is actuated to apply spot welds. The welding circuit is completed whenever the welding guns contact the strips, since the latter are always in contact with the other electrode, the electrically conductive facing 13 on the table top. Additional strings of welds may be applied to the strips by releasing frame 24 and changing its position.

From the foregoing description it is seen I have provided a welding apparatus of simplified construction and operation and which expeditiously aligns the strips and applies welds in straight lines perpendicular to the longitudinal center lines of the strips.

While I have shown and described only a single embodiment of the invention, it is apparent that modifications may arise. Therefore, I do not wish to be limited to the disclosure set forth but only by the scope of the appended claims.

I claim:

1. A welding apparatus for joining ends of metal strips comprising a support having a flat surface along which the strips may pass, a transverse frame bridging said support and being mounted thereon for longitudinal adjustment, a clamping device carried by said frame and having a lowered position in which it is adapted to engage and hold strips on said support and a raised position in which it clears the strips, motive means on said frame operatively connected with said clamping device for moving the latter, and a welding carriage carried by said frame for transverse adjustment and having a vertically movable welding device engageable with strips on said support.

2. A welding apparatus for joining ends of metal strips comprising a support having a flat surface along which the strips may pass, a transverse frame bridging said support and being mounted thereon for longitudinal adjustment, lock means on said frame for fixing said frame with respect to said support, a clamping device carried by said frame and having a lowered postion in which it is adapted to engage and hold strips on said support and a raised position in which it clears the strips, motive means on said frame operatively connected with said clamping device for moving the latter and simultaneously operating said lock means for fixing or releasing said frame with respect to said support, and a welding carriage carried by said frame for transverse adjustment and having a vertically movable welding device engageable with strips on said support.

3. A welding apparatus for joining ends of metal strips comprising a support having a flat table top along which the strips may pass, an electrically conductive facing on said table top, a transverse frame bridging said support and being mounted thereon for longitudinal adjustment, lock means on said frame for fixing said frame with respect to said support, a clamping device carried by said frame and having a lowered position in which it is adapted to engage and hold strips on said table top and a raised position in which it clears the strips, motive means on said frame operatively connected with said clamping device for moving the latter and simultaneously operating said lock means for fixing or releasing said frame with respect to said support, and a welding carriage carried by said frame for transverse adjustment and having a vertically movable electric welding gun engageable with strips on said table top.

4. A welding apparatus for joining ends of metal strips comprising a support having a flat table top along which strips may pass, an electrically conductive facing on said table top, guide means on said table top for aligning strips longitudinally preparatory to welding, a transverse frame bridging said support and being adjustable longitudinally of the support, a clamping plate hinged to said frame and having a lowered position in which it is adapted to engage and hold strips on said table top and a raised position in which it clears the strips, motive means on said frame operatively connected with said clamping plate for moving the latter, and a welding carriage carried by said frame for transverse adjustment and having a vertically movable electric welding gun engageable with strips on said table top.

5. A welding apparatus for joining ends of metal strips comprising a support having a flat table top along which strips may pass, an electrically conductive facing on said table top, guide means on said table top for aligning strips longitudinally preparatory to welding, a transverse frame bridging said support and being mounted thereon for longitudinal adjustment, lock means on said frame for fixing said frame with respect to said support, a clamping device carried by said frame and having a lowered position in which it is adapted to engage and hold strips on said table top and a raised position in which it clears the strips, motive means on said frame operatively connected with said clamping device for moving the latter and simultaneously operating said lock means for fixing or releasing said frame with respect to said support, and a welding carriage carried by said frame for transverse adjustment and having a vertically movable electric welding gun engageable with strips on said table top.

6. A welding apparatus for joining ends of metal strips comprising a support having a flat table top along which strips may pass, an electrically conductive facing on said table top, guide means on said table top for aligning strips longitudinally preparatory to welding, a transverse frame bridging said support and having side plates, a transverse beam and a transverse trackway connecting said side plates, rollers on said side plates mounting said frame on said support for adjustment longitudinally of said support, guide means on said table top and said frame constraining the adjustment path of said frame, lock means on said side plates for fixing said frame with respect to said support, a clamping plate hinged to said beam and having a lowered position in which it is adapted to engage and hold strips on said table top and a raised position in which it clears the strips, motive means carried by said beam and operatively connected with said clamping plate for moving the latter and simultaneously operating said lock means for fixing or releasing said frame with respect to said support, and a welding carriage carried by said trackway for transverse adjustment and having a vertically movable electric welding gun engageable with strips on said table top.

7. A welding apparatus for joining ends of metal strips comprising a support having a flat table top along which strips may pass, an electrically conductive facing on said table top, guide means on said table top for aligning strips longitudinally preparatory to welding, a longitudinal guide rail on the underface of said table top, a transverse frame bridging said support and having side plates, a transverse beam and a transverse trackway connecting said side plates, rollers on said side plates resting on said table top and mounting said frame for adjustment longitudinally of said support, additional rollers on said side plates engaging opposite faces of said guide rail and constraining the adjustment path of said frame, lock means on said side plates for fixing said frame with respect to said support, a clamping plate hinged to said beam and having a lowered position in which it is adapted to engage and hold strips on said table top and a raised position in which it clears the strips, fluid pressure means carried by said beam and operatively connected with said clamping plate for moving the latter and simultaneously operating said lock means for fixing or releasing said frame with respect to said support, and a welding carriage carried by said trackway for transverse adjustment and having a vertically movable electric welding gun engageable with strips on said table top.

8. A welding apparatus for joining ends of metal strips comprising a support having a flat table top along which strips may pass, an electrically conductive facing on said table top, transversely adjustable side guides on said table top for aligning strips longitudinally preparatory to welding, a longitudinal guide rail on the underface of said table top spaced from one edge, a transverse frame bridging said support and having vertical side plates, a transverse beam and a transverse trackway connecting said side plates, rollers on said side plates resting on said table top and mounting said frame for adjustment longitudinally of said support, additional rollers on one side plate engaging opposite faces of said guide rail and constraining the adjustment path of said frame, lock bars on said side plates engageable with the underface of said table top for fixing said frame with respect to said support, a clamping plate hinged to said beam and having a lowered position in which it is adapted to engage and hold strips on said table top and a raised position in which it clears the strips, a double acting fluid cylinder and piston carried by said beam and operatively connected with said clamping plate for moving the latter and simultaneously engaging or disengaging said lock bars with the underface of said table top, and a welding carriage carried by said trackway for transverse adjustment, and having a vertically movable electric welding gun engageable with strips on said table top.

WILLIAM H. DAILEY, Jr.

REFERENCES CITED

The following references are of record in the file of this patent:

UNITED STATES PATENTS

| Number | Name | Date |
| --- | --- | --- |
| 2,362,388 | MacChesney et al. | Nov. 7, 1944 |
| 2,369,830 | Johnson et al. | Feb. 20, 1945 |